July 29, 1969
H. P. GLASS
3,458,231
MOBILE CAMPER UNIT
Filed May 24, 1967
3 Sheets-Sheet 1
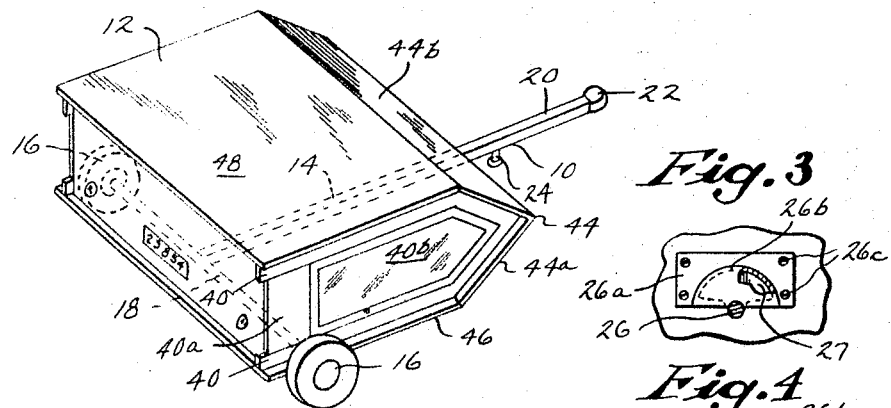
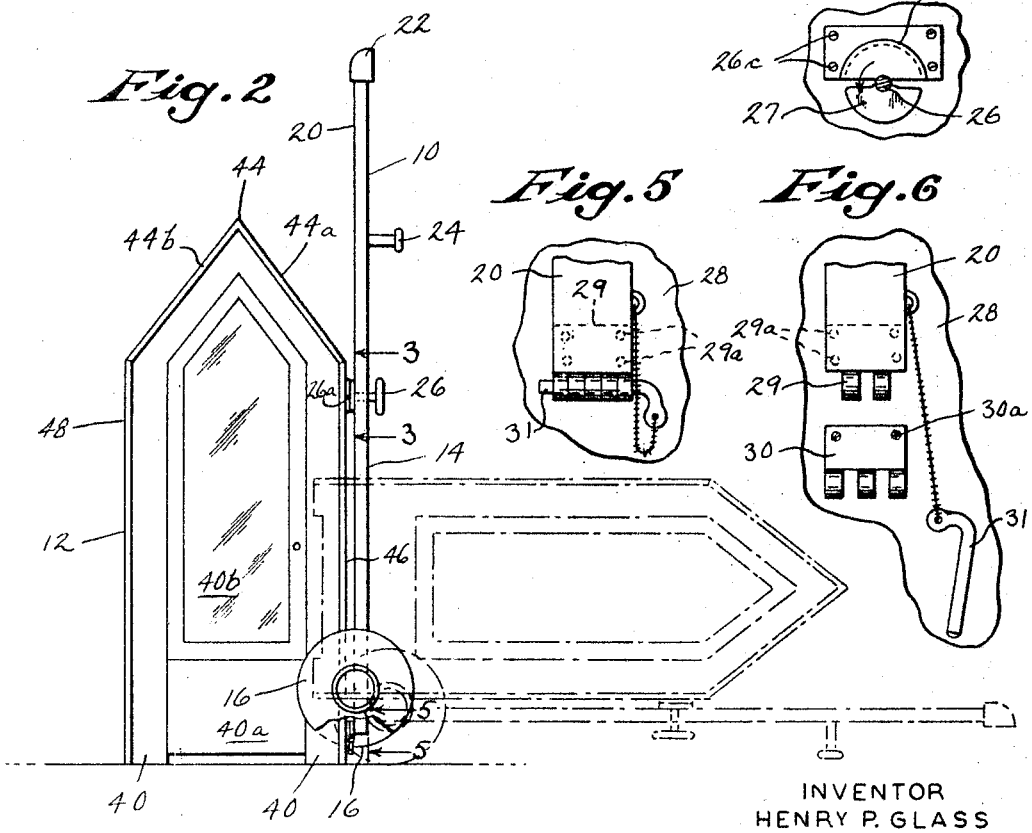
INVENTOR
HENRY P. GLASS
BY *Robert H Jacob*
AGT.

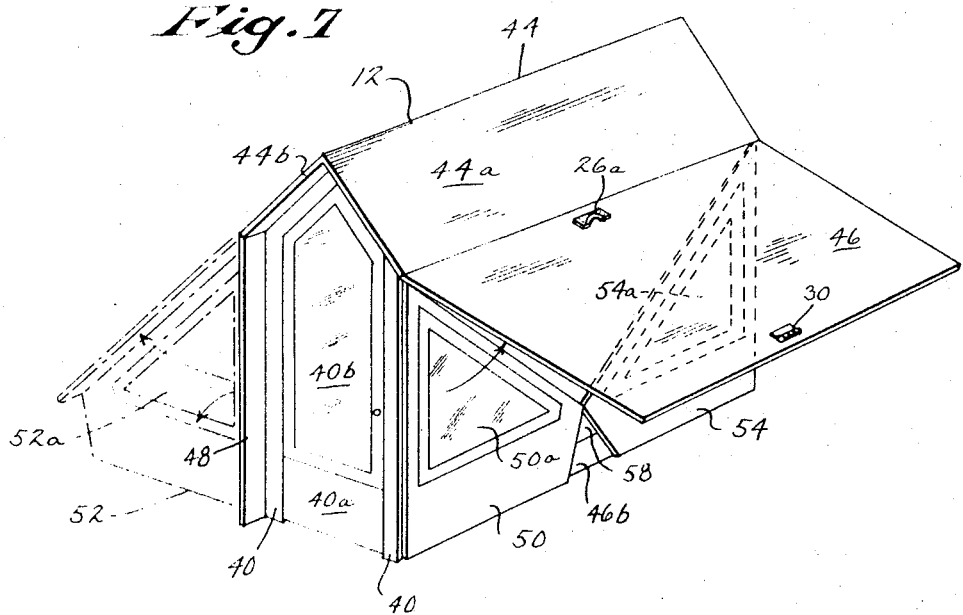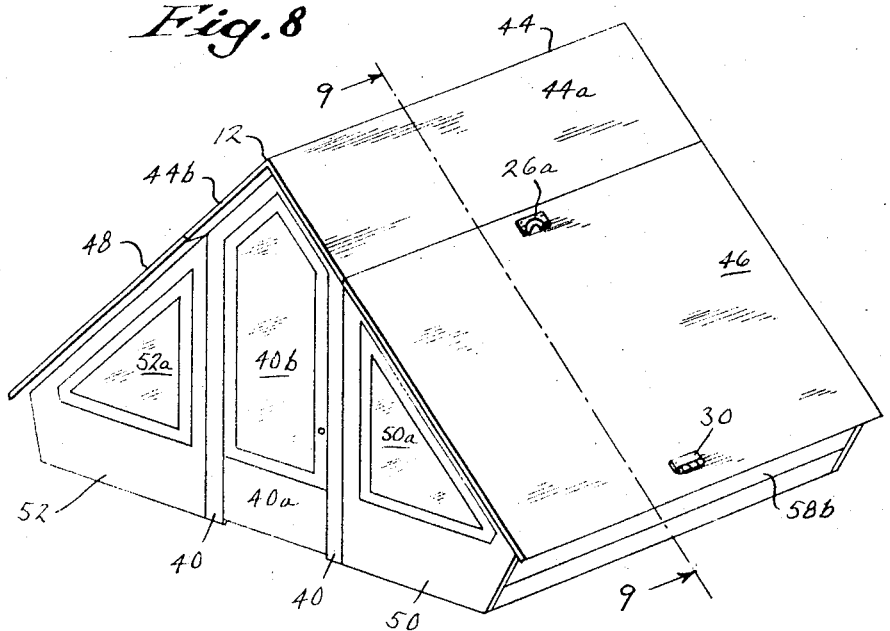

July 29, 1969  H. P. GLASS  3,458,231
MOBILE CAMPER UNIT

Filed May 24, 1967  3 Sheets-Sheet 3

INVENTOR
HENRY P. GLASS

BY *Robert H. [signature]*

AGT.

з,458,231
Patented July 29, 1969

3,458,231
MOBILE CAMPER UNIT
Henry Peter Glass, 666 Lake Shore Drive,
Chicago, Ill. 60611
Filed May 24, 1967, Ser. No. 640,931
Int. Cl. B60p *3/32;* B60v *15/00*
U.S. Cl. 296—23        7 Claims

ABSTRACT OF THE DISCLOSURE

A mobile camper unit comprises a trailer having a framework and a pair of wheels and a collapsible dwelling unit is carried on the trailer, being attached thereto by releasable latching means. The dwelling unit is removed from the trailer by upending it to set the dwelling unit on the ground and releasing the latching means. The collapsible dwelling unit comprises a base (floor), a roof, a pair of end walls with doors, a pair of hinged roof extensions, a pair of hinged end wall extensions for each end wall, and a pair of side extensions which are pivotably mounted on the base and fold down to provide side walls, beds and seats. A pivotable table and shelf are supported inside the dwelling.

SUMMARY OF THE INVENTION

This invention relates generally to mobile camper units such as camping trailers and the like.

Many types of mobile camper units such as mobile homes, camping trucks and camping trailers are presently available on the market. Usually, the mobile homes are relatively large and are fabricated of rigid materials and cannot be disassembled or collapsed to facilitate mobility. On the other hand, the camping trucks and trailers usually take one of two forms; namely, those built of rigid materials which cannot be disassembled and are relatively cramped and those which comprise tentlike extensions which are collapsible but relatively flimsy. It is desirable to provide an improved type of dwelling unit which provides the ease of collapsibility and portability of conventional camping trailers and also provides the spaciousness, strength and convenience presently found in conventional mobile homes.

In accordance with the present invention there is provided a mobile camper which comprises a collapsible dwelling unit which is removably mounted on a trailer and which is adapted to be removed from the trailer and unfolded to provide a habitable dwelling.

OBJECT OF THE INVENTION

It is an object of the present invention to provide an improved mobile dwelling unit of the camping trailer type which has the aforesaid advantages.

Another object is to provide a mobile camper of the aforesaid character wherein the dwelling unit is extremely compact and streamlined when collapsed, but which is spacious, sturdy, weatherproof and of good appearance when unfolded.

Another object is to provide a dwelling unit of the aforesaid character which can be easily loaded and unloaded from its trailer, which can be easily set up or collapsed by one person, and which contains as integral components thereof such features as beds, tables, seats, shelving, doors and windows.

Other objects and advantages of the invention will hereinafter appear.

DESCRIPTION OF THE DRAWINGS

The accompanying drawings illustrate one preferred embodiment of the invention, but it is to be understood that the embodiment illustrated is susceptible of modifications with respect to details thereof without departing from the scope of the appended claims.

In the drawings:

FIG. 1 is an isometric view of a mobile camper in accordance with the present invention and comprising a dwelling unit and trailer;

FIG. 2 is a side elevational view of the mobile camper showing the trailer upended and the dwelling unit resting on its base and showing in phantom a side elevational view of the mobile camper in towing position;

FIG. 3 is an enlarged plan view along the line 3—3 of FIG. 2 of the forward or upper latch used to connect the dwelling unit to the trailer and shows the latch in locked position;

FIG. 4 is a view similar to FIG. 3 but shows the latch in unlocked position;

FIG. 5 is an enlarged plan view along the line 5—5 of FIG. 2 of the rearward or lower latch used to connect the dwelling unit to the trailer and shows the latch in locked position;

FIG. 6 is a view similar to FIG. 5 but shows the latch in unlocked position;

FIG. 7 is an isometric view of the dwelling unit detached from the trailer, resting on its base and partially unfolded;

FIG. 8 is a view similar to FIG. 7 but showing the dwelling unit completely unfolded and ready for occupancy;

DETAILED DESCRIPTION OF THE INVENTION

Figure 9:
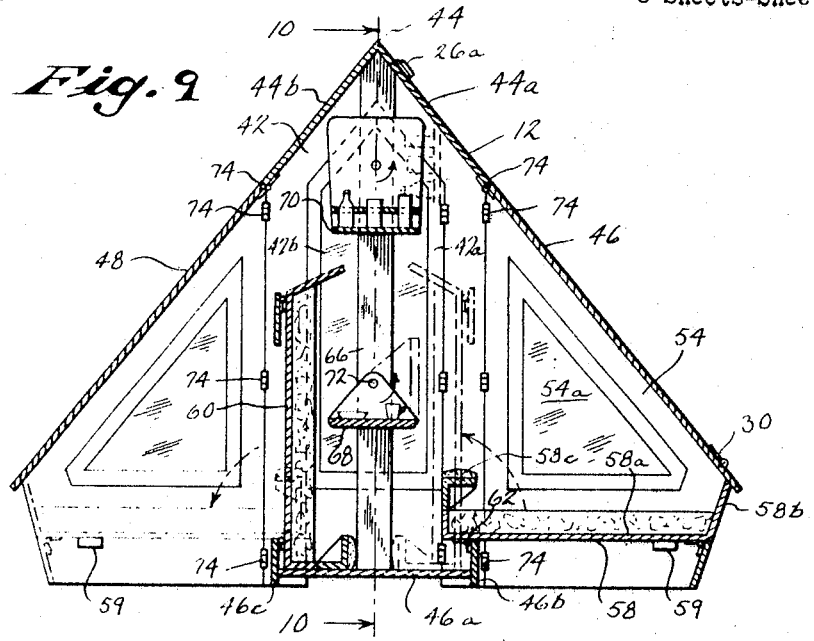
FIG. 9 is a cross sectional view of the dwelling unit taken along the line 9—9 of FIG. 8.

Referring to FIG. 1 of the drawings, there is shown a mobile camper according to the invention. The camper comprises a trailer 10 adapted to be towed by a motor vehicle (not shown) and a dwelling unit 12 in folded condition is mounted on trailer 10.

As FIGS. 1 and 2 show, trailer 10 comprises a suitable framework 14 and a pair of wheels 16. Framework 14 is preferably T-shaped and comprises a member 18 with the wheels 16 at each end and a transverse or drawbar member 20 which has one end connected to member 18 and has its other end adapted as by connection means or hitch 22 for connection to a motor vehicle. Trailer 10 is also provided with a support member 24 which enables it to assume a level position when unhitched. As FIG. 2 shows, dwelling unit 12 is so arranged on trailer 10 and the latter is so proportioned that when the trailer is upended by counterclockwise rotation (with respect to FIG. 2), dwelling unit 12 comes to rest on the ground and the wheels 16 of the trailer leave the ground.

As FIG. 2 shows, dwelling unit 12 is rigidly attached to trailer 10 by releasable latching means which take the form of an upper (forward) latch 26 and a lower (rearward) latch 28.

As FIGS. 3 and 4 show, upper latch 26 comprises two releasably engageable components 26a and 27. Preferably, component 26a is adapted to be attached to dwelling unit 12 and component 27 for attachment to trailer 10. Component 26a takes the form of a plate which is fastened as by bolts 26c to a portion of dwelling unit 12 and which has a disked or raised portion 26d beneath which component 27 can be rotated, as by turning of its handle 27b on shaft 27c which extends through transverse member 20 of trailer 10.

As FIGS. 5 and 6 show, lower latch 28 comprises two releasably engageable components 29 and 30 which can be joined together by a pintle 31 to provide a hinge-like latching means. In the embodiment shown, component 30 is fastened as by bolts 30a to a portion of dwelling unit 12 and component 29 is fastened as by bolts 29a to trailer 10.

Referring now to FIGS. 1, 2, and 7 to 10, it is seen that dwelling unit 12 comprises two end walls 40 and 42 to which are rigidly connected a roof 44 and a base 46. Base 46 comprises a floor 46a and two side runners 46b and 46c along the edges of the floor. Preferably, roof 44 comprises two sloped sections 44a and 44b to facilitate the shedding of rain and to achieve a streamlined effect when the camper is being towed. Roof 44 is provided with a pair of roof extension members 46 and 48 which are hingedly connected thereto. In the embodiment shown, the end walls 40 and 42 are both provided with doors 40a and 42a, respectively, but obviously only one door need be provided. In addition, the doors 40a and 42a are provided with windows 40b and 42b, respectively.

End wall 40 is provided with a pair of end wall extension members 50 and 52 which are hingedly connected thereto. Similarly end wall 42 is provided with a pair of end wall extension members 54 which are hingedly connected thereto, one of which can be seen in FIG. 7. Preferably, one or more of the four end wall extension members are provided with windows, such as the windows 50a, 52a and 54a.

Dwelling unit 12 further comprises a pair of side extension members 58 and 60 which are pivotably mounted on base 46. Side extension member 58 is a composite member having a portion 58a which serves as a mattress support or bed, a portion 58b which serves as a wall, and a portion 58c which serves as a seat. In the embodiment shown bed portion 58a of side extension 58 is pivotably connected by pivot means 62 to side runner 46b of base 46. Side member 60 is understood to be constructed in the same manner as side member 58 hereinbefore described.

Figure 10:
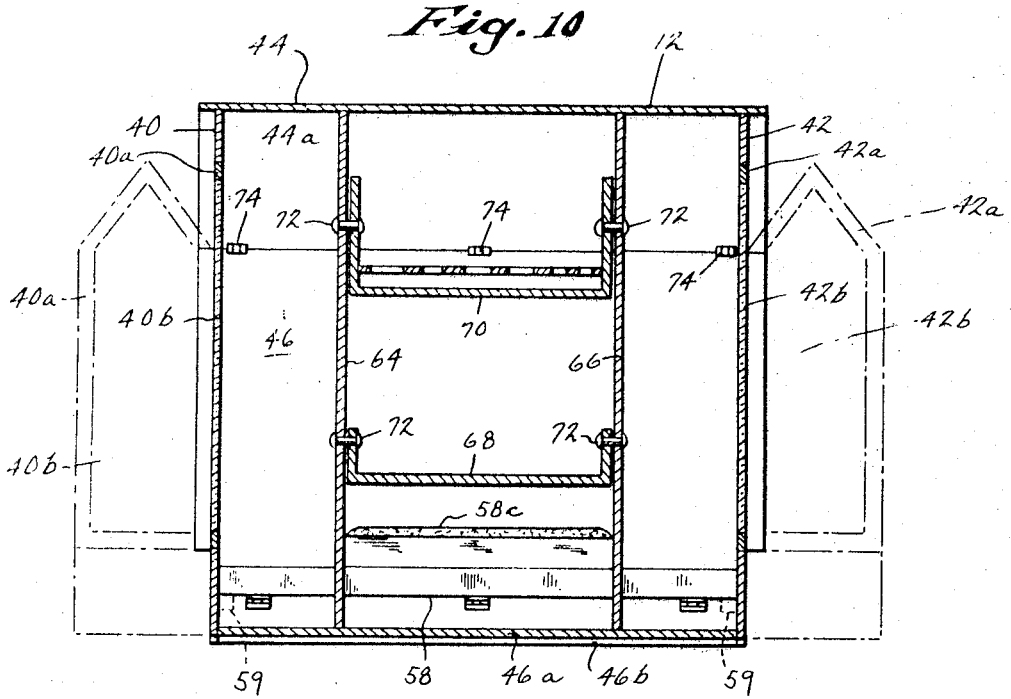
FIG. 10 is a cross sectional view of the dwelling unit taken along the line 10—10 of FIG. 9.

As FIGS. 9 and 10 show, the interior of dwelling unit 12 is provided with a pair of spaced apart supports 64 and 66 between which a table 68 and a shelf 70 are pivotably supported by pivot means 72. As FIG. 9 shows, table 68 and shelf 70 automatically swing to the positions shown in phantom when dwelling unit 12 is tipped on to its side. This permits objects to be left in place on the table or shelf while the camper is in transit.

It is to be understood that suitable hinges, such as the hinges 74 shown in FIGS. 9 and 10, are employed wherever required in dwelling unit 12 and that suitable latching devices (not shown) are employed at suitable locations to hold the various panel members in their folded and unfolded positions, where required.

When dwelling unit 12 is folded up, it has the appearance shown in FIGS. 1 and 2 and forms a relatively compact unit which takes up little space on trailer 10 and is easily handled by one or two people. After dwelling unit 12 is stood on its base 46, as shown in FIG. 2, and trailer 10 is disconnected by releasing latches 26 and 28, the dwelling unit is unfolded in the following manner.

As FIG. 7 shows, roof extension member 46 is unlatched and swung upward to a position which allows end wall extension members 50 and 54 to be swung outwardly to their final positions wherein member 46 can rest on them. Then, side extension member 58 is swung downwardly, as FIG. 9 shows, to a position wherein it provides a seat, bed and wall. Extension member 58 is supported near its outer end by supporting projections 59 provided on the end wall extensions 50 and 54. After the components making up one side of the dwelling have been unfolded and positioned, those making up the other side are similarly unfolded and positioned. Or this can be done simultaneously if several persons are available.

It is to be understood that the various walls, panels and components employed in the dwelling unit could be made of wood, metal or plastic and that they could be made of opaque, translucent or transparent materials, as desired.

I claim:

1. A collapsible dwelling unit releasably connected to a wheeled trailer which is tiltable about its wheel axis from a substantially horizontal position to a substantially vertical position whereby said dwelling unit is adapted to assume an upright position on the ground when said trailer is tilted to said vertical position, said dwelling unit comprising: a base, a pair of end walls connected to said base, at least one of said end walls having a door, a roof connected between said end walls, at least one roof extension pivotally connected near one side of said roof, and a pair of end wall extensions, each end wall extension pivotably connected to one edge of one end wall, said pair of end wall extensions affording support for said roof extension when in unfolded position, said pair of end wall extensions being foldable toward each other and said roof extension being foldable over said end wall extensions when said dwelling unit is in collapsed condition.

2. A mobile camper according to claim 1 wherein said collapsible dwelling unit further comprises at least one side extension member having a flat surface and first and second members transverse thereto, said side extension member being pivotally mounted on said base and having an unfolded position wherein its first member provides an exterior wall and said side extension member having a folded position wherein said side extension member is beneath said pair of end wall extensions.

3. A dwelling unit according to claim 2 comprising a pair of roof extensions, two pairs of end wall extensions, and a pair of side extension members.

4. A mobile camper according to claim 2 wherein said flat surface of said side extension member provides a bed when in unfolded position.

5. A mobile camper according to claim 4 wherein said second member of said side extension member provides a seat when in unfolded position.

6. A mobile camper according to claim 5 wherein said collapsible dwelling unit further comprises supports upon which a table is pivotably supported for rotation about an axis which is perpendicular to the directions in which said dwelling unit is tiltable.

7. A mobile camper according to claim 6 wherein a shelf is pivotably supported on said supports for rotation of said table.

References Cited

UNITED STATES PATENTS

| | | | |
|---|---|---|---|
| 3,062,579 | 11/1962 | Smith | 296—23 |
| 2,992,037 | 7/1961 | Nusbaum | 296—23 |
| 1,427,365 | 8/1922 | Douglas | 296—23 |
| 1,461,574 | 7/1923 | Caplan | 296—23.2 |
| 2,832,637 | 4/1958 | Decosse | 296—23.7 |

PHILIP GOODMAN, Primary Examiner